US 8,886,743 B2

(12) United States Patent
Jowett et al.

(10) Patent No.: US 8,886,743 B2
(45) Date of Patent: Nov. 11, 2014

(54) SYSTEM AND METHOD OF BROWSING OFFLINE AND QUERIED CONTENT

(75) Inventors: Frederick Haigh Jowett, London (GB); Mark Henstridge Williams, London (GB); Kirwan Lyster, London (GB); Kevin Laurence Benton, Essex (GB)

(73) Assignee: Open Text S.A., Luxembourg (LU)

( * ) Notice: Subject to any disclaimer, the term of this patent is extended or adjusted under 35 U.S.C. 154(b) by 209 days.

(21) Appl. No.: 13/598,335

(22) Filed: Aug. 29, 2012

(65) Prior Publication Data
US 2014/0201258 A1 Jul. 17, 2014

Related U.S. Application Data

(60) Provisional application No. 61/528,856, filed on Aug. 30, 2011, provisional application No. 61/531,461, filed on Sep. 6, 2011.

(51) Int. Cl.
*G06F 15/16* (2006.01)
*H04L 29/08* (2006.01)
*G06F 12/00* (2006.01)

(52) U.S. Cl.
CPC .................................... *H04L 67/18* (2013.01)
USPC ........................................................ 709/216

(58) Field of Classification Search
USPC .......... 709/214–219, 223–229, 250; 711/100, 711/113
See application file for complete search history.

(56) References Cited

U.S. PATENT DOCUMENTS

| 8,271,610 | B2 * | 9/2012 | Cao et al. ....................... 709/218 |
| 2002/0103934 | A1 * | 8/2002 | Fishman et al. ............. 709/246 |
| 2007/0219708 | A1 * | 9/2007 | Brasche et al. ............... 701/207 |
| 2008/0177859 | A1 * | 7/2008 | Nickerson ..................... 709/217 |
| 2009/0037393 | A1 * | 2/2009 | Fredricksen et al. ............ 707/3 |
| 2009/0210631 | A1 * | 8/2009 | Bosworth et al. ............. 711/141 |

* cited by examiner

Primary Examiner — Zarni Maung
(74) Attorney, Agent, or Firm — Sprinkle IP Law Group

(57) ABSTRACT

Embodiments of systems and methods for browsing offline and queried content are presented herein. Specifically, embodiments may receive a request for content from a mobile application. Embodiments may also determine whether the requested content is in a cache associated with the mobile application. If it is determined that the content is not in the cache, embodiments may deliver the requested content to the mobile application.

27 Claims, 9 Drawing Sheets

SYSTEM AND METHOD OF BROWSING OFFLINE AND QUERIED CONTENT

RELATED APPLICATIONS

This patent application claims the benefit of priority under 35 U.S.C. 119 to U.S. Provisional Patent Application Ser. No. 61/531,461, filed Sep. 6, 2011, entitled "SYSTEM AND METHOD OF BROWSING OFFLINE AND QUERIED CONTENT" and U.S. Provisional Patent Application Ser. No. 61/528,856, filed Aug. 30, 2011, entitled "SYSTEM AND METHOD OF BROWSING OFFLINE AND QUERIED CONTENT" which are incorporated herein in their entirety by reference.

TECHNICAL FIELD

This disclosure relates generally to systems and methods for the deployment of network based applications. Specifically, this disclosure relates to systems and methods for use in accessing content in connected or connectionless settings using a network based application.

BACKGROUND

In recent years the increasing prevalence of applications for mobile devices has led to greater amount of, and more varied amounts, of data traffic communicated through networks. The connectivity of such networks may, however, be intermittent. For example, a mobile device moving through cells being served by different base stations may lose connectivity to the wireless network or may otherwise lose connectivity. The lack, or intermittent loss, of connectivity does not however diminish the user's desire to access content.

The use of traditional web based caching of content may be inefficient or otherwise less than desirable as in certain contexts multiple or duplicative requests for content may be needed or it may be difficult to determine what content is in the cache in certain contexts.

Accordingly, it is desired to allow relatively easy and quick access to content even in connectionless settings or settings with only intermittent connectivity.

SUMMARY

Embodiments disclosed herein provide systems and methods that allow data (i.e. content) to be available on an application which is running on a mobile device, which by its nature operates in an untethered capacity to a network.

A platform server may maintain a list of content associated with the mobile application that is in the cache of a mobile device. If this content is requested again by the mobile application at the mobile device the platform server may not send such content to the mobile application.

Additionally, the user of the mobile application may view this content if connectivity is lost (i.e. in an offline setting). Thus, content stored in the cache at the mobile device may be viewed (or otherwise accessed) on the mobile device even if the mobile device is in an offline state.

To facilitate both caching of content, and access to the content stored in the cache, the mobile application may provide the user with an interface to allow the user to select the content to be cached and which of that content is to be displayed in an offline setting.

An embodiment may include a platform coupled to a network. The embodiment may receive a request for content from a mobile application, determine whether the requested content is in a cache associated with the mobile application, and if the content is not in the cache, deliver the requested content to the mobile application.

An embodiment may determine that the requested content should be cached, deliver the requested content with rules designating the conditions that the requested content should be stored in cache.

In an embodiment, the requested content includes a content identifier and the mobile application includes a mobile application identifier. An embodiment may determine if the content identifier is in an index. The index may store a mapping with an identifier for content associated with the mobile application stored in the cache and the mobile device identifier.

An embodiment may determine that the content stored in the cache is not a current version of the content, deliver the current version of the content.

In an embodiment, the request for content may be associated with content associated with a link on a page. An embodiment may determine that the content associated with the link is not within the cache.

In an embodiment, the request may be a subscription request for content with an assigned tag. The system may determine that there is new content associated with the assigned tag, and push the new content associated with the assigned tag to the cache.

Another embodiment may include delivering content when the mobile application is initialized.

In another embodiment, the content includes a page layout template and content objects, the page layout template defining a page layout where the content objects are displayed.

In an embodiment, a mobile application may enable a user to manage the content stored in the cache.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

DETAILED DESCRIPTION

Figure 1:
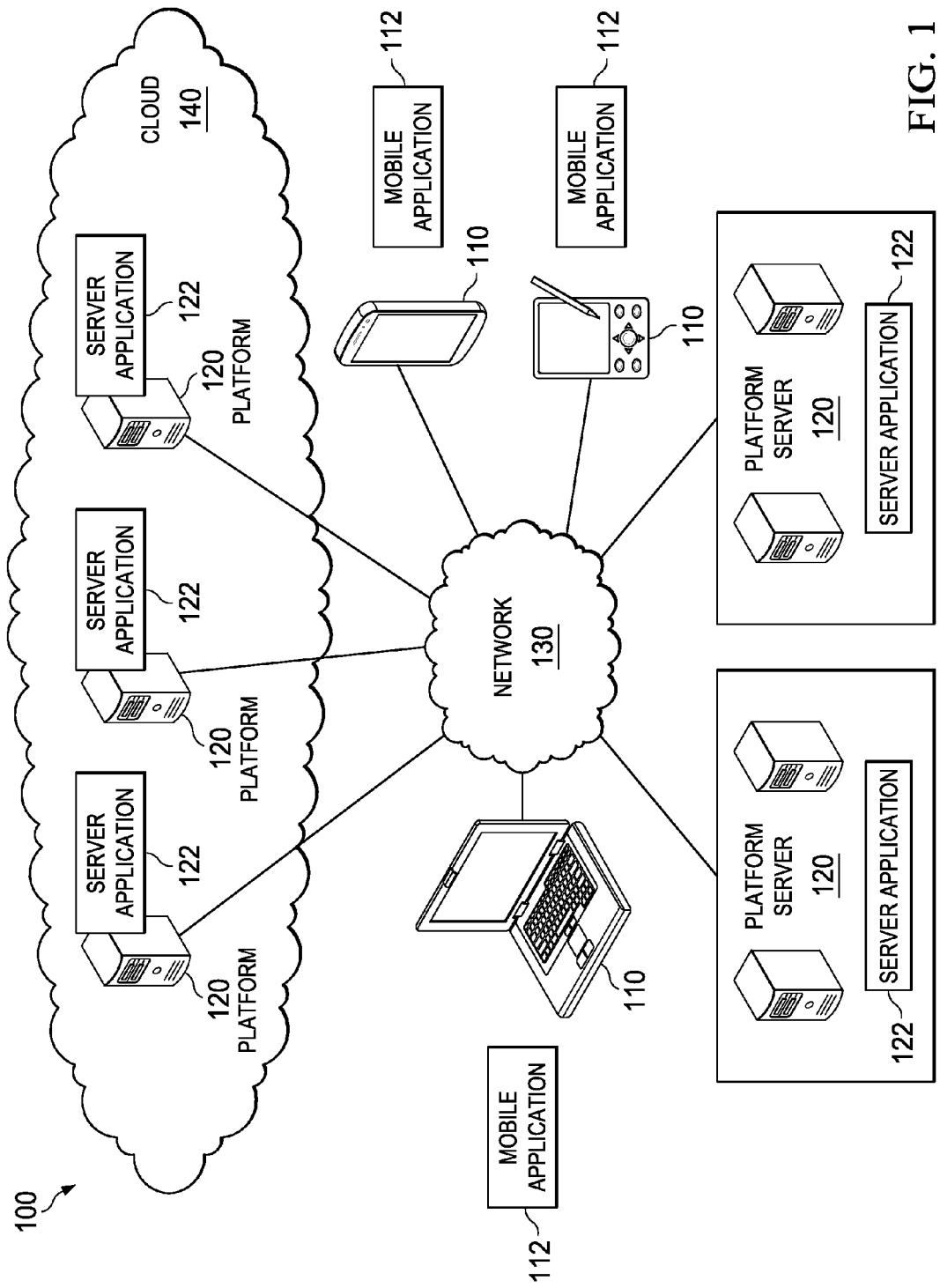
FIG. 1 depicts a block diagram illustrating one embodiment of a topology for deploying a mobile application.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Embodiments of the present invention can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols. It will be understood for purposes of this disclosure that a module is one or more computer processes, computing devices or both, configured to perform one or more functions. A module may present one or more interfaces which can be utilized to access these functions. Such interfaces include APIs, web services interfaces presented for a web services, remote procedure calls, remote method invocation, etc.

Before turning to specific embodiments as disclosed herein, a general discussion of the deployment of mobile applications may prove useful. Accordingly, FIG. 1 depicts one embodiment of topology 100 used for the deployment of an application on a mobile device 110. The topology 100 includes one or more mobile devices 110 connected to one or more platform servers 120 over a network 130.

The network 130 may be a wired or wireless network such as the Internet, an intranet, a LAN, a WAN, a cellular network or another type of network. It will be understood that network 130 may be a combination of multiple different kinds of wired or wireless networks.

Mobile devices 110 may be smart phones, laptop computers, personal data assistants or any other type of device that can process instructions and connect to network 130 or one or more portions of network 130.

Each platform server 120 may be a general platform server that is capable of supporting multiple server applications 122 (which may be one or more modules), and each platform 120 may include one or more server applications 122 addressable at single location. The server applications 122 of a particular platform 120 may be deployed on physical computing devices residing at a particular location (such as those associated with the provider of a particular mobile application) or may be deployed in a cloud 140.

Cloud 140 may be, for example, a cloud such as the Amazon Elastic Compute Cloud (EC2). Thus, when a platform server 120 is deployed in the cloud 140, the server application (s) 122 may be executing on a virtual machine provided in the cloud 140, where the virtual machine is addressable at a single location.

Regardless of the location of the platform server 120, the server applications 122 of a platform server 120 may be a module that may be used to support one or more applications 112 deployed on a mobile device 110. More specifically, an application 112 deployed on a mobile device 110 may contact a particular platform server 120, in return the server application 122 on the platform server 120 returns content, such as pages, to the application 112 on the mobile device 110. The application 112 on the mobile device 110, in turn, it may filter content, render content for presentation to the user, or be used in other functionality performed by the application 112 on the mobile device 110.

As discussed above then, the increasing prevalence of applications, including those for mobile devices, has led to greater amount of, and more varied amounts, of data traffic communicated through networks. The connectivity of such networks may, however, be intermittent. It would thus be desirable to allow access to data, even during periods without connectivity.

Attention is thus directed to embodiments of systems and methods for caching or otherwise storing data (collectively referred to herein as caching) in conjunction with a deployed platform. As understood in this disclosure the term platform may refer to a deployed mobile application and the platform servers supporting that deployed mobile application.

More specifically, in certain embodiments, one or more caches may be maintained on a mobile device on which a mobile application is deployed. Content associated with the mobile application may be stored in the cache such that this content may be displayed to the user of the mobile application (or otherwise accessed by the user) if connectivity is lost (i.e. when the mobile device is offline).

In particular, in one embodiment, a platform may maintain a list of content associated with the mobile application that is in the cache of a mobile device. If this content is requested again by the mobile application at the mobile device the platform server may not send such content to the mobile application. Additionally, the user of the mobile application may view this content if connectivity is lost (i.e. in an offline setting). Thus, content stored in the cache at the mobile device may be viewed (or otherwise accessed) on the mobile device even if the mobile device is in an offline state. To facilitate both caching of content, and access to the content stored in the cache, the mobile application may provide the user with an interface to allow the user to select the content to be cached and which of that content is to be displayed in an offline setting.

Figure 2:
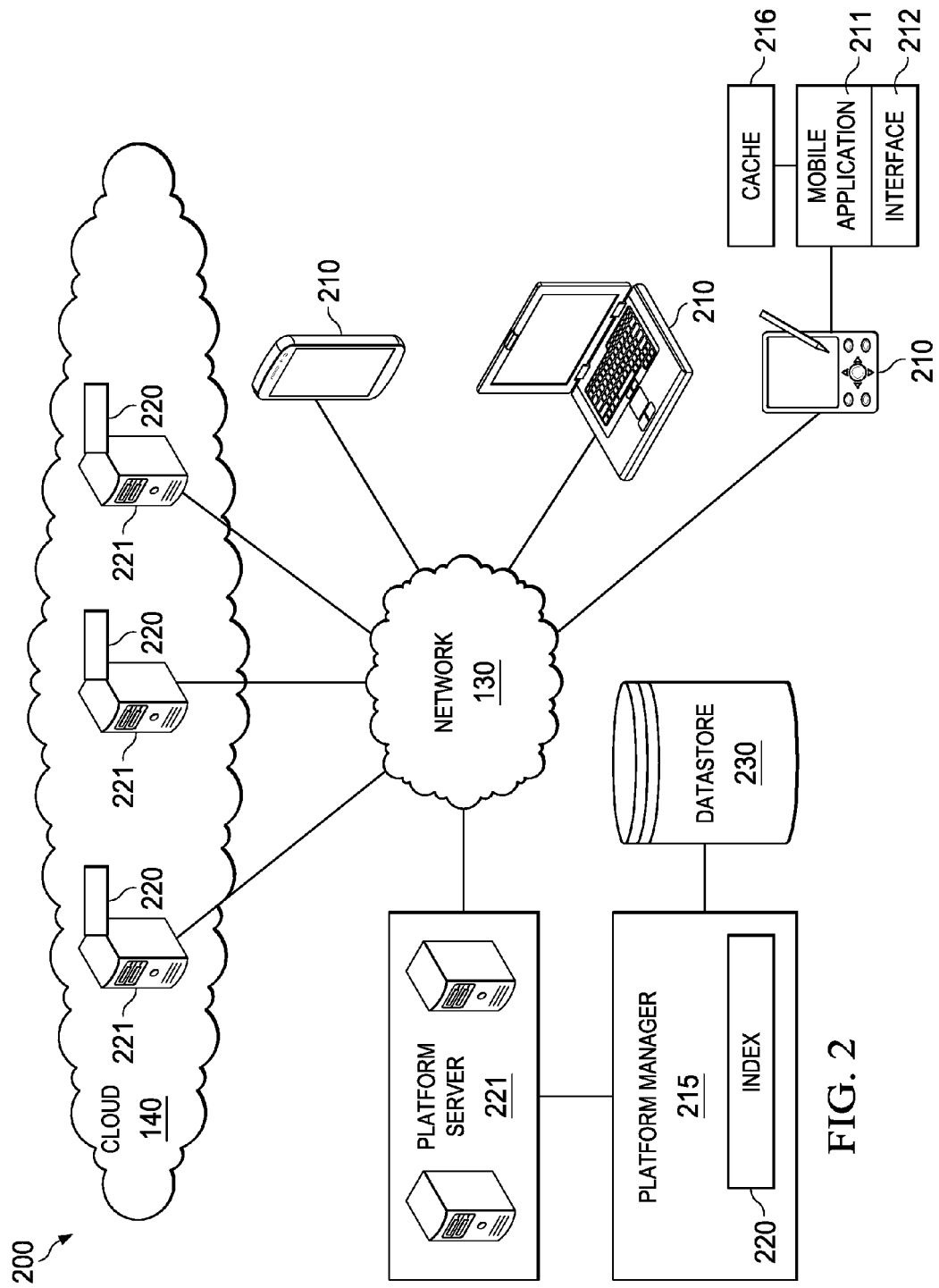
FIG. 2 depicts a block diagram illustrating one embodiment of a topology with an index to manage a cache.

Moving now to FIG. 2, one embodiment of a topology 200 for the deployment of a mobile application 211 that includes the caching of content is depicted. The mobile application 211 may be appropriately configured to execute on mobile device 210 on which it is deployed and comprise an interface 212 for interacting with the mobile application 211 or the mobile device 210.

The mobile device 210 may comprise a cache 216 at least a portion of which may be associated with the mobile application 211. Mobile application 211 may be configured to store content to cache 216, delete content from cache 216 or perform other operations associated with the manipulation of content with respect to cache 216. Mobile application 211 may be, for example, configured to perform such operations, for example, in response to an instruction.

Cache 216 may be an area of a file store, dedicated memory chips or some other storage medium. In certain embodiments, cache 216 may be associated with a cache utilized to store content in the cache 216.

Interface 212 may be configured to allow interactions or actions to be specified with respect to the mobile device 210, the mobile application 211 or cache 216. For example, a button or an interaction such as a finger swipe on interface 212 may allow a page to be saved, deleted or any other cache manipulation operation within cache 216.

The mobile application 211 may be configured to render content according to a particular data model. Thus, when mobile application 211 is activated it may contact a particular platform server 221 and request content. Platform server 221 may include platform manager 215 and data store 230.

Platform server 221 may be a multi-tenant server configured to communicate with any number of integrated servers. Each platform server 221 may be associated with at least one application 211. For a single mobile application 211, platform manager 215 may utilize or execute components that are stored within data store 230 to support that mobile application 211. Data store 230 may be a file store, memory or some other storage medium configured to store components (e.g. modules, instructions, etc.) to support a mobile application 211, as well as content to be displayed by mobile application 211. Therefore, platform server 221 may simultaneously host a plurality of mobile applications 211 associated with different servers.

Mobile application 211 deployed on mobile device 210 may request content from platform manager 215. Platform manager 215 may locate requested content and format or package the content according to the data model and respond to the mobile application 211 with the formatted content. This content can then be rendered by the mobile application 211 for presentation via interface 212 to a user of the mobile device 210.

Platform manager 215 may also control the caching on the mobile device associated with mobile application 211. Thus, when mobile application 211 initially connects to a platform server 221 a unique ID token is generated for the mobile device 210 executing the mobile application 211 and the unique ID token is stored at the platform manager 215. The platform manager 215 can then track all content sent to the mobile application 211 on mobile device 210, which of that content is cached and maintain a status of the cache 216 of that mobile device 210 associated with that mobile application 211.

In one embodiment, the platform manager 215 may maintain a mobile application cache index table (index) 220 associated with mobile application 211. Index 220 may store a mapping with an identifier for content associated with the mobile application 211 stored in the cache 216 of mobile device 210 and the unique id of the mobile device 210 executing that mobile application 211.

When a mobile device 210 initially connects to the platform server 221 (e.g. when the mobile application 211 is launched or the user logs into the mobile application 211) there is a communication between the platform manager 215 on the platform server 221 and the mobile application 211 to synchronize the state of the content within cache 216 and the information in index 220 of the platform manager 215. In certain embodiments, if the mobile application 211 and platform manager 215 differ on what content is stored within cache 216, platform manager 215 may instruct mobile application 211 to delete all the content within cache 216.

When content is subsequently requested by the mobile application 211, platform manager 215 can determine if the content is in cache 216 of the mobile device 210 using index 220. If the content is in cache 216 it may not be delivered by platform manager 215. Otherwise the content may be delivered.

Platform manager 215 may be configured to communicate to a mobile application 211, and instruct mobile application 211 with respect to the placement of delivered content in cache 216. Examples of instruction associated with caching content are: a platform manager 215 may instruct a mobile application 211 to not cache specific content, cache the content for only the current session and upon a user logging off of the mobile application 211 the content may be cleared from the cache 216, cache the content for only a period of time, etc. These instructions may be created by a mobile application developer, such that when content is being delivered from platform manager 215 the instructions may be send along with the content.

Thus, when the content is delivered to the mobile device 210 it may be marked as cacheable, not cacheable or include other instructions associated with the caching (or not caching) of the delivered content. Platform manager 215 can update index 220 accordingly. If the content is marked as cacheable it may be stored in the cache 216 of the mobile device 210. If requested content was not delivered and the client does not have it in cache 216, the mobile application 211 may re-request this content or other recovery mechanisms may be provided.

By managing cache 216 from the platform server 221, requests for and delivery of content can be avoided. Thus, bandwidth may be reduced and latency avoided. Furthermore, because platform manager 215 maintains an index 220 of what is in cache 216, the mobile application 211 can be notified of changes to content that is in the cache 216. For example, if a platform manager 215 detects that content has changed and index 220 indicates that the content is in the cache 216 at the mobile device 210, a notification may be sent to the mobile application 211. In response to this notification the content may be purged from cache 216 and may be immediately re-requested, re-requested at a later point or not re-requested.

Additionally, content stored in the cache 216 may be presented to a user in an offline setting. More specifically, in one embodiment, if a mobile application 211 cannot connect to platform server 221 or otherwise detects a loss of connectivity (e.g. a measure of network latency, delay, throughput or another measurement exceeds or falls below a threshold) a list of content in the cache 216 may be presented via interface 212 to the user by the mobile application 211. The user may be allowed to select content for display and mobile application 211 will display the selected content to the user from cache 216 through interface 212.

In one embodiment, mobile application 211 may initially present a current, or most recent, page of content from cache 216 through interface 212. The user may then navigate from this page using interface 212, as the user navigates if the content associated with the user's navigation is in cache 216 it may be presented to the user by the mobile application 211. Otherwise the mobile application 211 may attempt to reconnect to the platform server 221 and if this attempt fails present a message to the user that the content is unavailable. In another embodiment, to avoid the selection of unavailable content, on each page that is presented to a user, the content available in cache 216 may be identified (e.g. visually or otherwise) by highlighting links to this content in a different color or otherwise.

It will be noted that there may be certain pages that it is desired to have always available to a user regardless of connectivity. Thus, it may be desired to guarantee that such pages are always stored at mobile device 210. These pages may include, for example, cache management pages, cache interface pages, home pages, splash screens, pages designated by a user, pages to view what content is within cache 216, pages that may be utilized to view the mobile application 211 in an offline capacity, or other types of pages. To ensure such pages are always available they (along with any associated content) may be included in mobile application 211.

In another embodiment, when mobile application 211 is initialized it may fetch these guaranteed pages and any associated content from platform manager 215 in the background (and may be done without manual user intervention or navigation). These pages and their associated content may be stored in cache 216. Thus, for example there may be a list of guaranteed pages that are to be retrieved (if not already in cache 216) by mobile application 211 when it is initially installed, started for the first time, whenever a session is initiated, etc. Alternatively, whenever mobile application starts a new session platform manager 215 may push these pages to the mobile application 211. There may be a flag or other indicator associated with these guaranteed pages in cache 216 to ensure that these guaranteed pages are not deleted.

In certain embodiments, the guaranteed pages may be pages with relatively static content, such as specification sheets, offline encyclopedias, etc. These guaranteed pages may be part of mobile application 211 such that mobile application 211 can populate the cache 216 with these guaranteed pages while the application 210 is being initialized (or otherwise started or executed) on mobile device 210. Therefore, mobile application 211 may be a completely offline application and may not need connectivity for a user to view content associated with the mobile application 211 other then when originally downloading the application 210. If these guaranteed pages are later updated, platform manager 215 may automatically push the updated pages to be stored within cache 216.

Along with using cache 216 to optimize communications between platform server 221 and mobile application 211 and to allow offline content viewing, cache 216 may be optimized to allow for updating of content. This process may be performed at platform manager 215 and mobile device 210 in the background (and may be done without manual user intervention).

More specifically, when platform manager 215 tracks cached content via index 220 that was communicated to mobile application 211, platform manager 215 may also create a hash of the cached content and store the hash in association with the identifier of the cached content in the index 220. If platform manager 215 later determines that the same content is within data store 230 but has a different hash, platform manager 215 may determine that the content has changed. Then, platform manager 215 may send an update message to mobile application 211 identified as having that content in cache 216, indicating that content has been changed.

In one embodiment, a default behavior may be to send an instruction to mobile application 211 to remove the identified content from cache 216 and to update index 220. Therefore, the next time mobile application 211 requests that content, platform manager 215 will determine via index 220 that the content is not within cache 216, and communicate the content (e.g. the updated version of the content) to mobile application 211.

In another embodiment, platform manager 215 may communicate the updated content to application 210 with an instruction to remove the stale content from cache 216, and replace it with the new content.

In another embodiment, to identify that content being displayed to the user through interface 212 (e.g. from cache 216) is not the most current version, or that the content may be updated, such content may be identified (e.g. visually or otherwise) by highlighting links to this content in a different color or otherwise.

Figure 3:
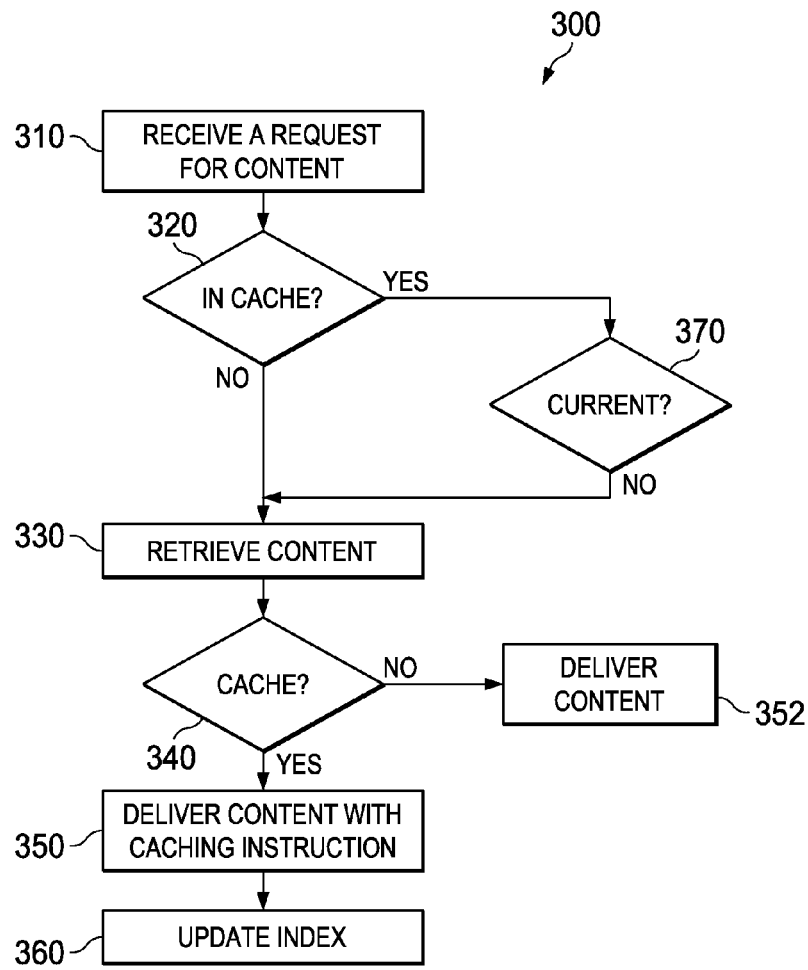
FIG. 3 depicts an embodiment of a method for the managing content for an application on a mobile device.

FIG. 3 depicts an embodiment of a method 300 for managing content in association with an application on a mobile device.

At step 310, a request for content from an application on a mobile device may be received. This request may have a content identifier associated with the content being requested by the application, an application identifier associated with the application that is requesting the content or a mobile device identifier associated with the mobile device where the mobile application making the request is executing. Such identifiers may be expressly assigned or may be based on the protocols or techniques used in effectuating communications. For example, a mobile device identifier may include, or be based on, MAC addresses or other information which may be obtained about the mobile device, including information related to hardware or software of the mobile device.

At step 320, it can be determined if the requested content is in the cache at the mobile device. In one embodiment, an index of content in the cache of the mobile device may be maintained, where the index comprises the mobile device identifier associated with previously delivered content that is stored in the cache of the associated mobile device.

If the content identifier for the requested content is not in the index it can be determined that the requested content is not in the cache of the mobile device. The content may then be retrieved at step 330. A determination can then be made if the retrieved content should be cached on the mobile device at step 340. In one embodiment, a designation to cache, not cache, or rules to determine when such content should or should not be cached (e.g. based on certain criteria) or that the content should be cached in association with certain conditions may be stored in association with the content. Any designations or rules associated with the content may be evaluated to determine if the content should be cached. If there are no designations or rules, a default may be utilized (e.g. attempt to cache all content or do not cache any content) to make the determination if the content should be cached.

If it is determined that the content should not be cached at step 340, the content may be delivered to the mobile application at step 352. If, however, it is determined that the content should be cached at step 340, the content may be delivered to the requesting mobile application at step 350 along with an instruction that designates that the content should be cached and under what conditions (if any) the content should be stored in the cache (e.g. the conditions under which such should be deleted, such as expiration of time, occurrence of an event, etc.). The index can then be updated at step 360 by storing the content identifier for the content in the cache in association with the mobile device identifier.

If it is determined that the content should not be cached at step 340, the content may just be delivered to the mobile application at step 352.

Returning to step 320, if the content identifier for the requested content is in the index in association with the mobile device identifier, it can be determined that the content is in the cache of the mobile device. If the content is in the cache of the mobile device the content may not be delivered to the requesting mobile application. Alternatively, in one embodiment, it can be determined at step 370 if the content stored in the cache at the mobile device is the current version of the content.

In one embodiment, a hash of the content stored in the cache of the mobile device may be stored in association with the content identifier in the index. The current version of the content may be identified using the content identifier of the request and the hash of the current version of the content obtained. The hash of the version of the content in the cache at the mobile device (e.g. stored in the index) may then be compared with the hash of the current version of the content. If the two hashes are the same it can be determined that the version of the content in the cache of the mobile device is the current version and no further action may be taken. If however, the current version of the content may be retrieved at step 330 and steps 340, 350 and 360 repeated substantially as described above. In such embodiments, when the index is updated at step 360 in addition to storing the content identifier for the content in the index in association with the mobile device identifier the hash for the content delivered to the mobile device may also be stored in the index.

Figure 4:
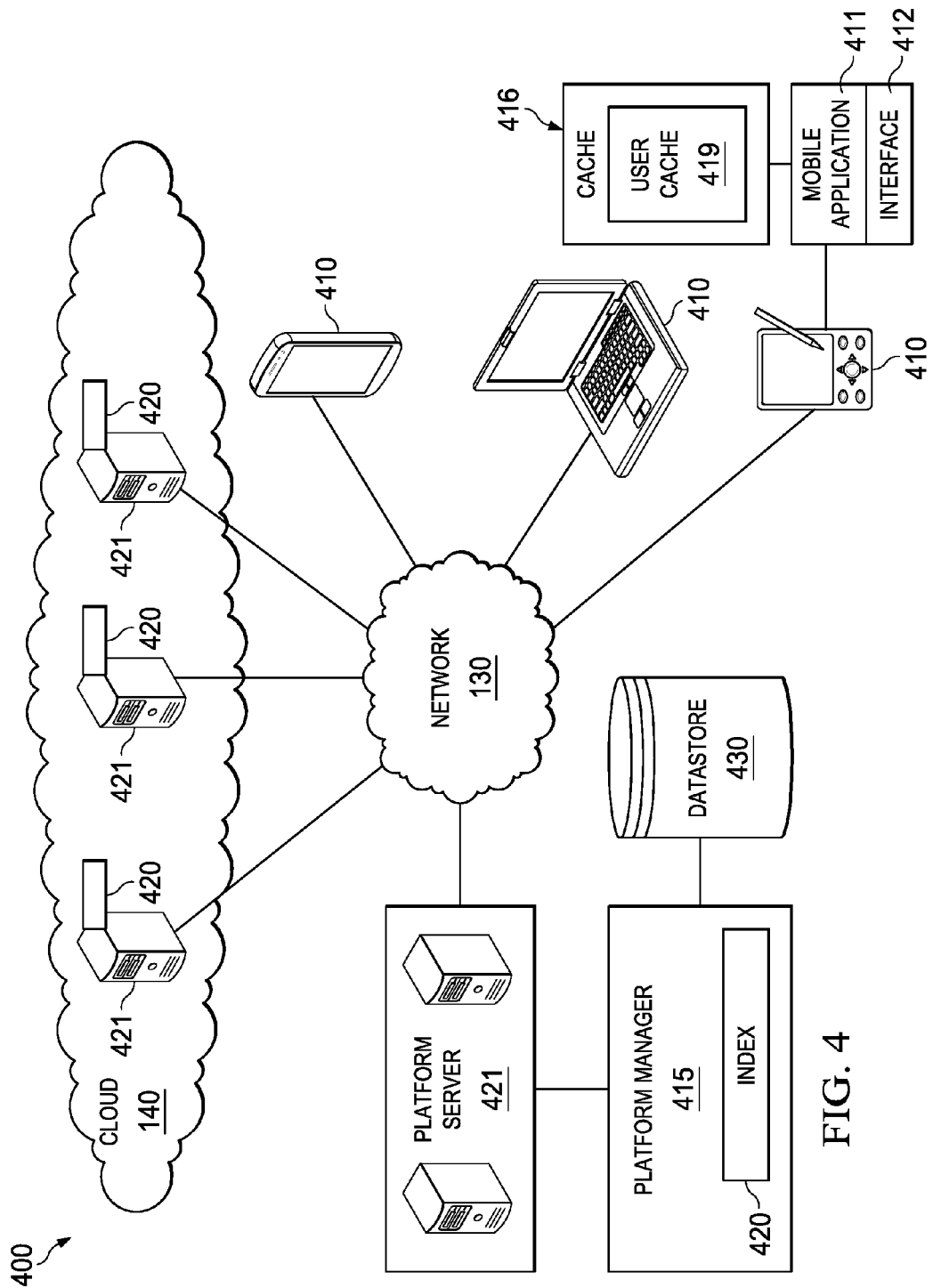
FIG. 4 depicts a block diagram of one embodiment of a topology.

Turning now to FIG. 4, one embodiment of a topology 400 for the deployment of a mobile application 411 that includes the caching of content within a user cache 419 is depicted.

In an embodiment, platform manager 415 may have control of what content should be stored within cache 416, with a default set as if content is delivered from platform manager 415 to mobile application 411 the content should be stored within cache 416. Then index 420 may be updated to reflect the content stored within cache 416.

Alternatively, or additionally, a user of the mobile application 411 may be given control over what is stored in a cache 416. In such embodiments, user cache 419, which may be located within cache 416 may be kept at mobile device 110. User cache 419 may be an area of a file store, dedicated memory chips or some other storage medium. In certain embodiments, user cache 419 may be associated with a cache utilized to store content in the user cache 419. Mobile application 411 may present a user with the ability to select or otherwise designate content to be stored in user cache 419. For example, a user of mobile application 411 may be given the ability to select an article being viewed, content associated with a link (both that has been, or has not yet been, received from platform server 421), content associated with a user specified or selected keywords, content associated with a particular area of a presented page, etc. This selection may be implemented through actions supplied by mobile application 411 that allow user inputs to be associated with a particular part of a display. These actions may include a "save" action that allows the content associated with an area of the display to be saved in user cache 419. Actions may also be added to deal with user cache 419 maintenance, such as expiration configuration, cache size, amount of data currently in user cache, to remove content from user cache, etc.

Upon a user selecting content to be stored in user cache 419, platform manager 415 may receive an instruction to update index 420 to include the user request to manage the content in user cache 419.

In one embodiment, if a user has explicitly saved content within user cache 419, then even if the content has been updated at platform manager 415, platform manager 415 may not send an instruction to update or remove the associated content within user cache 419. Platform manager 415 may instead deliver an instruction to mobile application 411 indicating that an updated version of the content is available at platform manager 415. In other embodiments, if a user has explicitly saved content within user cache 419, the user may be given an option to receive instructions to update the associated content.

Thus, in such cases the lifecycle of content saved to user cache 419 may not be the control of platform manager 415 (and thus may not be in index 420 of platform manager 415) and may instead by under user control.

It will be understood that in some embodiments similar functionality may be implemented using cache 416, and thus a separate user cache 419 may not be required. In such embodiments, parameters may be associated with content stored in cache 616 that indicate whether content was stored in cache 416 by platform server 221 or by user selection.

Retrieval of content in user cache 419 may be similar to the retrieval of content in cache 216 as discussed above. In one embodiment, content presented by mobile application 411 may utilize a document model comprised of object types connected together to form the interface. The content stored in the user cache 419 may be associated with their respective object types and these object types may be used to present a list of content in user cache 419 to the user or to display such content. In some embodiments, all the information to retrieve and present the content is stored in user cache 419 along with the content.

Specifically, in one embodiment, an interface on mobile application 411 may include a page that allows content from the user cache 419 to populate a page. When the page is loaded this control may query the user cache 419 to retrieve content within user cache 419 and display the content on the interface.

Figure 5:
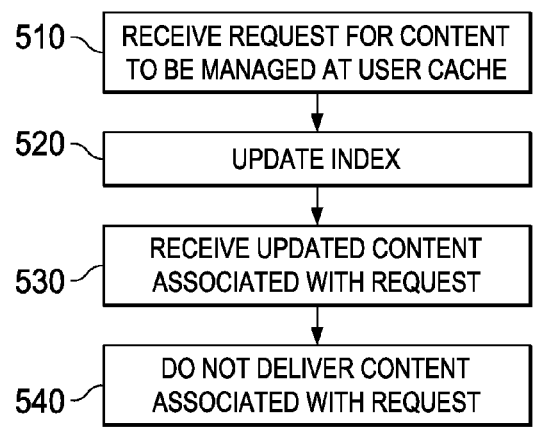
FIG. 5 depicts an embodiment of a method for caching content within a user cache.

FIG. 5 depicts an embodiment of a method 500 for caching content within a user cache.

At step 510, a request that a user selected content to be managed at a user cache on a mobile device associated with a mobile application may be received.

A user of mobile application may select content to be managed at a user cache by selecting content being viewed, content associated with a link (both that has been, or has not yet been, received from platform server), content associated with a user specified or selected keywords, content associated with a particular area of a presented page, etc.

This selection may be implemented through actions supplied by an interface on the mobile application that allow user inputs to be associated with a particular part of a display. These actions may include a "save" action that allows the content associated with an area of the display to be saved in user cache. Actions may also include rules of how to deal with user cache maintenance, such as expiration configuration, cache size, amount of data currently in user cache, to remove content from user cache, etc.

Upon a user selecting content to be managed at a user cache, a request associated with the selection and rules may be received along with a content identifier associated with the selected content to be managed at user cache, an application identifier associated with the application or a mobile device identifier associated with the mobile application making the request is executing.

At step 520, an index may be updated by storing the content identifier associated with the selected content to be managed at user cache in association with the mobile application identifier.

At step 530, a new version of the content associated with the request to manage content at the user content may be received. In one embodiment, it may be determined that the content associated with the request has been updated by using a hash of the content stored in the user cache in association with the content identifier in the index. The current version of the content may be identified using the content identifier of the content within the user cache and a hash of the current version of the content obtained. The hash of the version of the content in the user cache may then be compared with the hash of the current version of the content. If the two hashes are the same it can be determined that the version of the content in the user cache at the mobile device is the current version and no further action may be taken. However, if the two hashes are different it can be determined that the version of the content in the cache at the mobile device is not the most current version of the content.

At step 540, the current content associated with the content stored at the user cache may not be delivered to the mobile application or an instruction to remove the associated content within the user cache may not be sent. In one embodiment, an instruction may be delivered to the mobile application indicating that an updated version of the content is available at a platform server. In other embodiments, an instruction with an option to receive the updated content associated with the request may be delivered.

Figure 6:
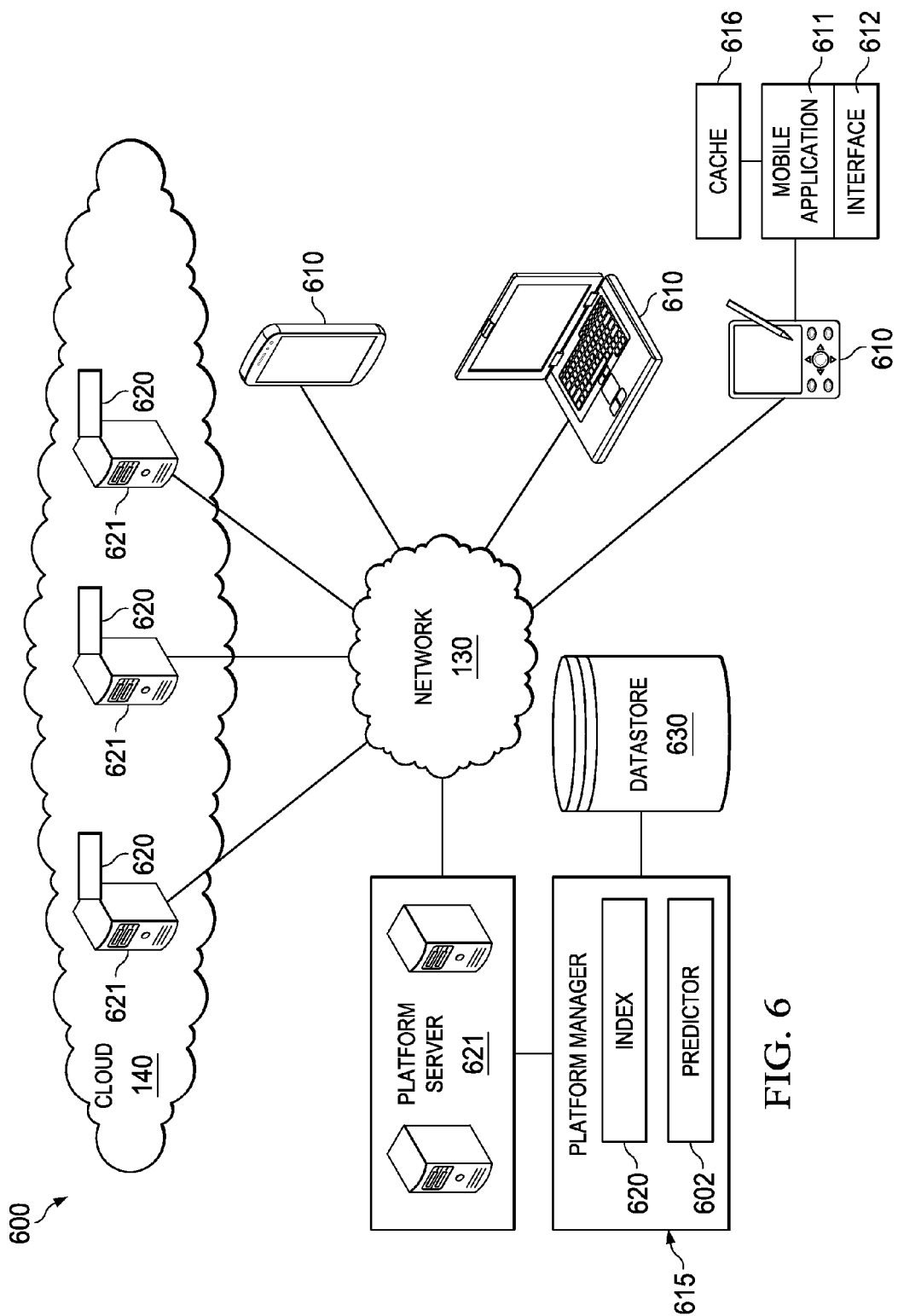
FIG. 6 depicts a block diagram of one embodiment topology.

Turning to FIG. 6, one embodiment of a topology 600 for the deployment of a mobile application 611 that may predict what content may be requested by a mobile application 611 is depicted. Elements of FIG. 6 may be similar to the elements described above and thus may not be explained in more detail.

As depicted in FIG. 6 platform manager 615 may include predictor 602. Predictor 602 may be a module configured to parse a request for content, and proactively predict what content may be subsequently requested by a mobile application 611. For example, if an application delivers a request for content, and the content includes links associated with further content, predictor 602 may determine that a user using application 611 may desire to view the content associated with the links.

Platform manager 615 may then deliver the content associated with the links to the application 611 without the content associated with the links being explicitly requested. The content associated with the links may be stored in cache 616 associated with the application 611, which may be viewed if the mobile device is in an online or offline state. As such, the platform manager 615 may deliver these pages as a "look ahead" or predictive model.

Platform manager 615 may also utilize index 620 to determine if the content associated with the links has been previously communicated to mobile application 611 and is within cache 616. If the content associated with the links is within cache 616, platform manager 615 may determine that the content associated with the links should not be communicated because the content is locally accessible for application 611.

Although predictor 602 is depicted as being within platform manager 615, in various embodiments predictor 602 may be located within mobile application 610. In this embodiment, predictor 602 may locally determine if the application requests content and the content includes links. If so, predictor 602 may deliver a request for the content associated with the links.

Figure 7:
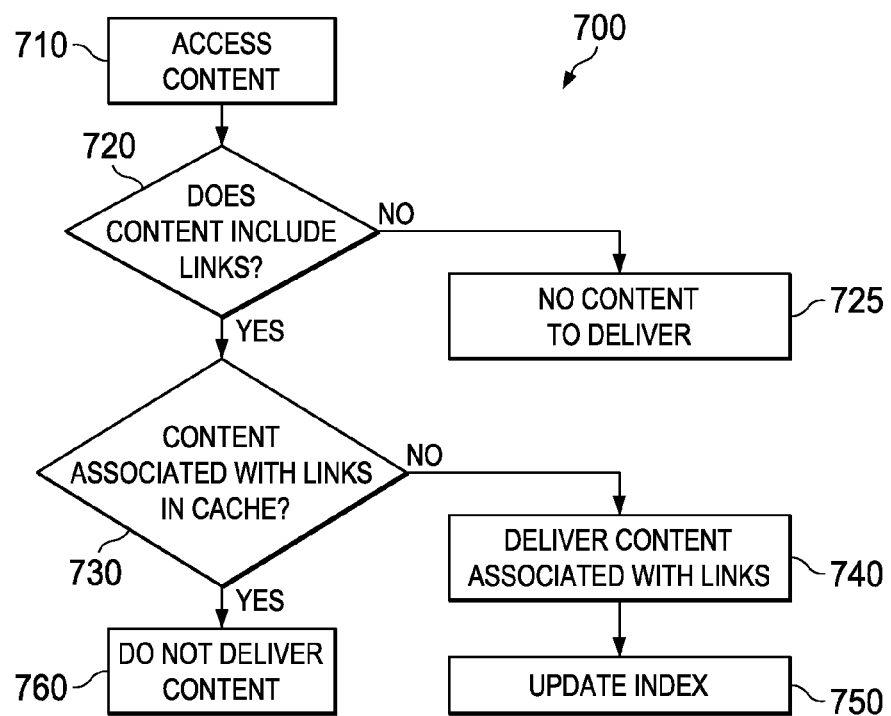
FIG. 7 depicts an embodiment of a method for predicting content that may be requested by a mobile application.

FIG. 7 depicts an embodiment of a method 700 for predicting what content may be requested by a mobile application.

At step 710, an application may access content, and a request for the content may be received. This request may have a content identifier associated with the content being requested by the application, an application identifier associated with the application that is requesting the content or a mobile device identifier associated with the mobile device where the mobile application making the request is executing. Such identifiers may be expressly assigned or may be based on the protocols or techniques used in effectuating communications. For example, a mobile device identifier may include, or be based on, MAC addresses or other information which may be obtained about the mobile device, including information related to hardware or software of the mobile device.

At step 720, it may be determined if the request for content includes links to content. In one embodiment, if an application requests content and the content includes links, it may be determined that the request includes a request for content associated with the links.

If it is determined that the request for content does include content with links at step 720, then at step 730, it may be determined if the content associated with the links is in a cache at the mobile device. In one embodiment, an index of content in the cache of the mobile device may be maintained, where the index comprises the mobile device identifier associated with previously delivered content that is stored in the cache of the associated mobile device. If the content identifier for the content associated with the links is not in the index it can be determined that the content associated with the links is not in the cache of the mobile device.

If it is determined that the content associated with the links is not within a cache at step 730, the content may be delivered to the mobile application at step 740, and stored in a cache associated with the mobile application.

The index can then be updated at step 750 by storing the content identifier for the delivered content associated with the links in the cache in association with the mobile device identifier.

If it is determined that the content associated with the links is within cache at step 730, the content associated with the links may be not be delivered to the mobile application at step 760. If the content associated with the links is within cache, it may determine that the content associated with the links will not be delivered to the application because the content associated with the links should already be locally accessible for application.

Returning to step 720, if it is determined that the request for content does not include content associated with links, then the method may continue to step 725 where it may be determined that there is no content currently being requested to deliver to the mobile application.

Figure 8:
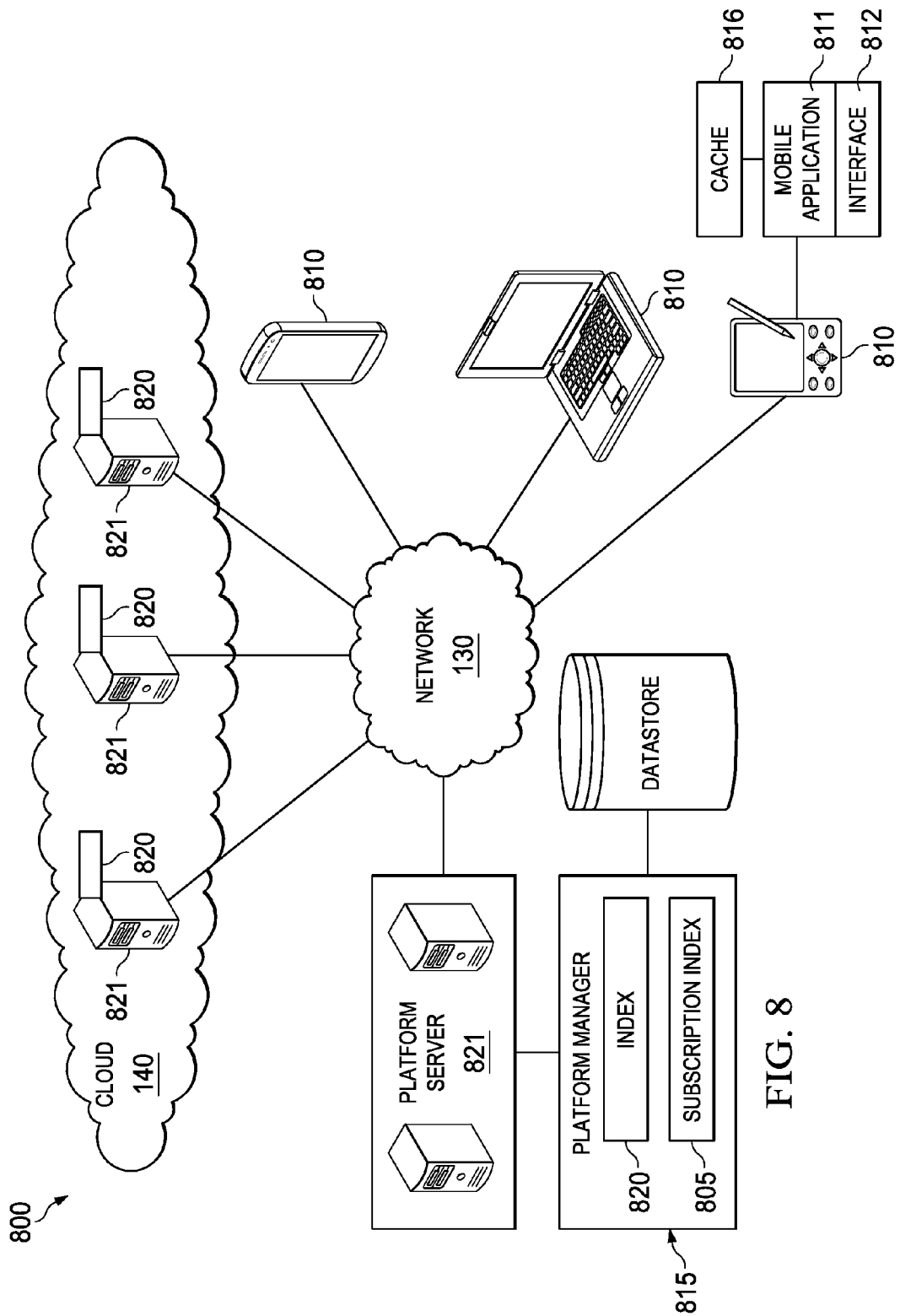
FIG. 8 depicts one embodiment of a topology.

Turning to FIG. 8, one embodiment of a topology 800 for the deployment of a mobile application 811 that delivers content to application 811 on a subscription basis is depicted. Elements of FIG. 8 may be similar to the elements described above and thus such functionality may not be explained here in detail.

A platform manager 815 may be a module configured to deliver content to mobile application 811 based on a subscription basis.

Subscription index 805 may store a mapping with an identifier for subscription requests for the mobile application 811 and a unique id of the mobile device 810 executing mobile application 811. The subscription request may be related to a particular topic, such as sports, a governmental election, news related to a geographical region, or any other topic.

A user may be able to subscribe to a subscription using an interface associated with mobile application 811 by selecting a tag associated with a topic. The selection of the tag may be made by clicking a button associated with a tag, highlighting a link associated with a tag, free form typing a tag, or any other known method.

If platform manager 815 receives a request that a user associated with application 811 desires a new subscription, platform manager 815 may correspondingly update subscription index 805 for the subscription request. The subscription request may include a subscription identifier associated with the subscription tags being requested by the application, an application identifier associated with the application that is requesting the content or a mobile device identifier associated with the mobile device where the mobile application making the request is executing. Such identifiers may be expressly assigned or may be based on the protocols or techniques used in effectuating communications. For example, a mobile device identifier may include, or be based on, MAC addresses or other information which may be obtained about the mobile device, including information related to hardware or software of the mobile device.

When content is received at platform server 821, platform manager 815 may profile the content, and assign a corresponding tag to the content. This process may either be completed manually be an administrator of the platform server 821 by reviewing the content or a creator of the content may assign a tag to the content when creating the content. If the user has a subscription associated with a certain tag, and new content is added to the platform server 821 with the tag, then the tagged content may be delivered into a cache 816 associated with the application 811 without a request for the content.

The content delivered to mobile application 811 based on the subscription may be stored in cache 816 associated with mobile application 811. Platform manager 815 can then track all content sent to the mobile application 811 on that mobile device 810, including the new content associated with the subscription, and update index 820 to include the delivered content associated with the subscription. This content may be viewed if the mobile device 810 is in an online or offline state.

Figure 9:
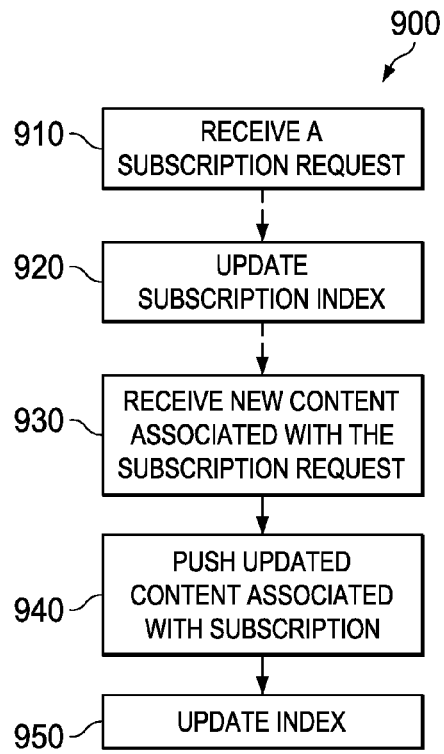
FIG. 9 depicts an embodiment of a method for delivering content to an application on a subscription basis is depicted.

FIG. 9 depicts an embodiment of a method 900 for delivering content to an application on a subscription basis is depicted.

At step 910, a subscription request may be received. The subscription request may be related with a particular topic and indicate that the user desires to receive any new content associated with a particular tag, such as sports, a governmental election, news related to a geographical region, or any other topic. A user may be able to subscribe to a subscription by selecting a tag associated with a topic. The selection of the tag may be made by clicking a button associated with a tag, highlighting a link associated with a tag, free form typing a tag, or any other known method.

The received subscription request may include a subscription identifier associated with the subscription topic being requested by the application, an application identifier associated with the application that is requesting the content or a mobile device identifier associated with the mobile device where the mobile application making the request is executing. Such identifiers may be expressly assigned or may be based on the protocols or techniques used in effectuating communications. For example, a mobile device identifier may include, or be based on, MAC addresses or other information which may be obtained about the mobile device.

At step 920, an index may be updated to include information associated with the subscription request for a certain topic for the application. The index may store a mapping with an identifier for what topics associated with the subscription request and the unique id of the mobile device executing that mobile application or a mobile application identifier.

At step 930, it may be determined if any new content associated with the subscription request is available. When new content is received, an administrator of a platform or the creator of the content may assign corresponding tags to the new content. Using the identifiers for what topics an application is assigned to within the subscription index, it may be determined what subscriptions a user is subscribed to. If the user has a subscription associated with a tag for a topic, and new content is added with the tag, then it may be determined that there is new content available associated with a subscription for a mobile application. One skilled in the art will appreciate that this step may proactively identify when new content associated with a subscription request is available, independent of receiving additional subscription requests.

At step 910, if the user has a subscription associated with a certain topic and new content is available with a corresponding tag, then the content may be delivered into a cache associated with the application without a further request for content.

The index can then be updated at step 950 by storing a content identifier for the delivered content in the cache in association with the mobile device identifier associated with the application or a mobile application identifier.

Figure 10:
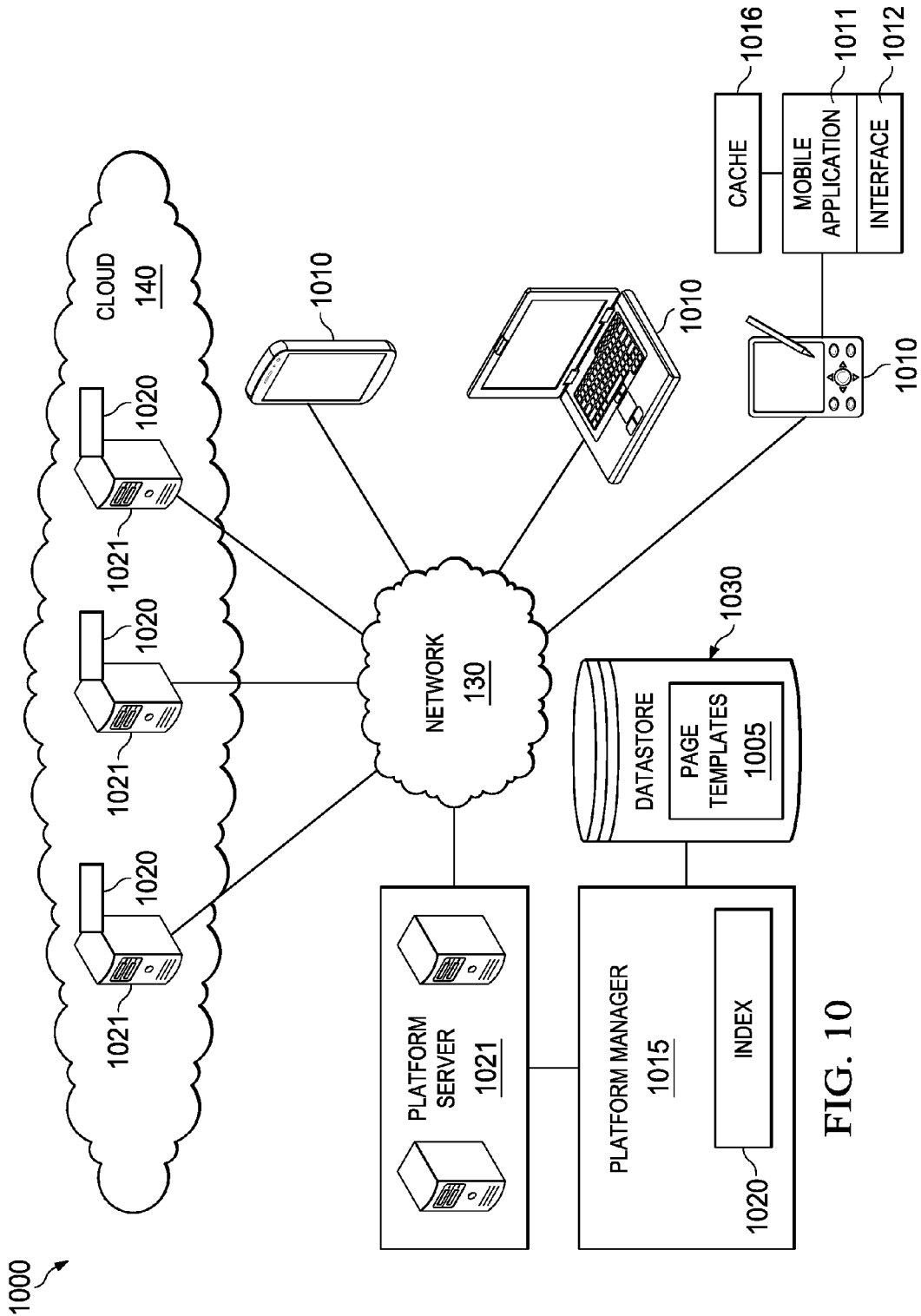
FIG. 10 depicts a block diagram of one embodiment of a topology.

Turning to FIG. 10, one embodiment of a topology 1000 for a document model including page templates 1005 to display content to a user is depicted. Elements of FIG. 10 may be similar to the elements described above and thus may not be explained in more detail.

In some embodiments, content may be delivered (and stored in cache) separately from the pages themselves. Data store 1030 may store page templates 1005.

The page templates 1005 may be block-based (nested blocks that can each contain a data element). The lowest level may be an atomic block which may be non-modifiable). The second level may be a "container block" which contains atomic blocks. These blocks may be assigned stylistic features. The document model may be page based. Content may be displayed as page, which may be a top level container, where a page defines a page template 1005 which is further defined by, for example, a content schema. The page may define an XML schema for a page template 1005. It should be noted here that embodiment is proved by way of example only, other document model or page template formats may be utilized and document models and page templates 1005 may be utilized either alone or together, as desired. In one embodiment the document model is designed to be rendered by mobile application 911.

Page templates 1005 may allow for the layout features of a page to be delivered and stored independently within cache 1016 with respect to delivered content. Because layouts for a page may not change rapidly, it may not be desired to communicate page templates 1005 as frequently as delivering content. Also, because page templates 1005 may be communicated independently from content, the layout of the pages may be changed without communicating content to mobile application 1011, and different users may utilize different page templates 1005.

Page templates 1005 may include style elements and layout elements that dictate how content is rendered by mobile application 1011. Style elements may be associated with colors, margins, and other visual elements of a page. Layout elements may be what and where different page elements such as buttons, controls and content should be displayed on a page or may be associated with the orientation of the page. Thus, a section of a page template 1005 or page may define content objects and content to be displayed in association with these content objects. Because layout elements define what elements or content should be displayed where on a page, content may be communicated to mobile application 1011 and be populated in the page based on the layout.

Page templates 1005 may allow fluid screen alteration (e.g. from portrait to landscape and vice versa). This is important because it may be desirable to change the layout of a displayed page depending on the orientation in which it is displayed. In some embodiments, to change the layout of a page it may be necessary to deliver two different pages to support two different types of layouts for content. This may be inefficient as it may require two separate communications. Utilizing page templates 1005 may alleviate this inefficiency as the page templates 1005 comprise a framework that may dictate how the delivered content is to be displayed based on orientation of the device or other criteria. Thus, the content associated with the objects of the page template 1005 may be delivered separately from the content itself.

As the content associated with the objects in a page template 1005 can be delivered separately from the page template 1005 and the page template 1005 defines how the page is laid out and what content is to be displayed and how that content is to be displayed (rules), content can be requested separately of page template 1005. Thus, content can now be requested (and stored in cache) separately from the delivery of a page template 1005. This content may be requested based on certain actions, such as application initiated, user button press, at some time frame. This content can be displayed without fetching new page template, thus content can be updated separately from the page template 1005.

Accordingly, in some embodiments, since a page template 1005 is relatively static, these page templates can be designated as a guaranteed page and content can saved in cache 1016 separately from the page template 1005. This allows the display of content to be dynamic. When a page template 1005 is rendered for display by the mobile application 1011 content associated with the objects of the template can be located in cache 1016 if it is there or requested and received from platform manager 1015. When content is received it can be stored in cache 1016, the cache 1016 may be populated as above, by user command, automatically, such as for example, saving content received in response to every content request or by some other method.

When a mobile device 1010 loses connectivity the content in the cache 1016 may be used to render the content within page template 1005 or the user may access such content automatically. By having the page template 1005 be a guaranteed page, where the page template 1005 includes the framework to render the content in both landscape and portrait format (or other layouts), even in cases where the mobile device 1010 is offline such these pages may be presented in either landscape or portrait views.

In certain embodiments then, all the page templates 1005 needed to create a mobile application 1011 (e.g. home page, index page, detail page, etc.) can be included with the mobile application 1011. In these embodiments, then, it may only be necessary to request and retrieve content to be rendered according to these page templates 1005. Thus, these pages may be displayed even in cases where little or no content can be either retrieved or is stored in cache.

Figure 11:
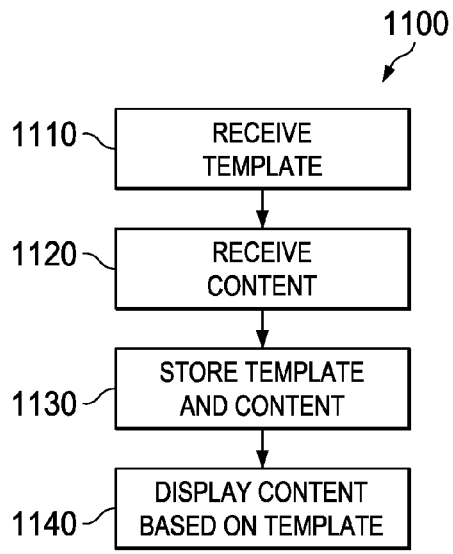
FIG. 11 depicts an embodiment of a method for delivering a page template to display content on an interface.

FIG. 11 depicts an embodiment of a method 1110 for delivering a page template to display content on an interface.

At step 1110, a page template may be received. A page template may include style elements and layout elements that dictate how content is displayed on an interface. Style elements may be associated with colors, margins, and other visual elements of a page. Layout elements may be what and where different page elements such as buttons, controls and content should be displayed on a page. Templates may allow fluid screen alteration (e.g. from portrait to landscape and vice versa). It may be desired to change the layout of content depending on the orientation in which it is displayed. Therefore, it may be necessary to deliver two different pages to support two different types of layouts for content.

At step 1120, content may be received. Content may be any data that may be displayed on an interface. Content may be requested based on certain actions, such as application initiated, user button press, at some time frame.

At step 1130, the template and content may be stored at a cache. The template and the content may be received and stored separately. Because templates for a page may not change rapidly, it may not be desired to communicate templates as frequently as delivering content. Also, because templates may be communicated independently from content, the layout of the pages may be changed without communicating content to mobile application, and different users may utilize different page templates.

At step 1140, the content may be displayed on an interface based on the style and layout elements of the page template. If an application loses connectivity, the content in the cache may be displayed based on the template. By having a template stored in cache, where the template includes the framework to render the content in both landscape and portrait format (or other layouts), even in cases where the mobile application is offline such these pages may be presented in wither landscape or portrait views.

In the foregoing specification, embodiments have been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system for browsing content comprising:
a platform coupled to a network, including:
  a processor; and
  a computer readable medium comprising instructions configured to:
    receive a request for content from a mobile application;
    determine whether the requested content is in a cache associated with the mobile application, and
    if the content is not in the cache, deliver the requested content to the mobile application, wherein the requested content is configured to be presented to a user; and
  receive a notification that the requested content was stored in the cache associated with the mobile application, wherein the requested content was stored in the cache based on a user selection.

2. The system of claim 1, wherein the instructions are further configured to:
  determine that the requested content should be cached; and
  deliver the requested content with rules designating conditions that requested content should be stored in the cache.

3. The system of claim 1, wherein the requested content includes a content identifier and the mobile application includes a mobile application identifier, and the instructions are further configured to:
  determine if the content identifier is in an index, the index storing a mapping with an identifier for content associated with the mobile application stored in the cache and the mobile device identifier; and
  update the index to include the content identifier for the requested content and the mobile application identifier.

4. The system of claim 1, wherein the instructions are further configured to:
  determine that the content stored in the cache is not a current version of the content; and
  deliver the current version of the content.

5. The system of claim 1, wherein the request for content includes content associated with a link on a page, and the instructions are configured to:
  determine that the content associated with the link is not within the cache.

6. The system of claim 1, wherein the request is a subscription request for content with an assigned tag, and the instructions are configured to:
  determine that there is new content associated with the assigned tag;
  deliver the new content associated with the assigned tag to the cache without a further subscription request.

7. The system of claim 1, wherein the instructions are further configured to:
  deliver content when the mobile application is initialized.

8. The system of claim 1, wherein the content includes a page layout template and content objects, the page layout template defining a page layout where the content objects are displayed.

9. The system of claim 1, wherein the mobile application is configured to enable a user to manage the content stored in the cache.

10. A method for browsing content comprising:
  receiving a request for content from a mobile application;
  determining whether the requested content is in a cache associated with the mobile application, and
  if the content is not in the cache, delivering the requested content to the mobile application, wherein the requested content is configured to be presented to a user; and
  receiving a notification that the requested content was stored in the cache associated with the mobile application, wherein the requested content was stored in the cache based on a user selection.

11. The method of claim 10, further including:
  determining that the requested content should be cached; and delivering the requested content with rules designating conditions that requested content should be stored in the cache.

12. The method of claim 10, wherein the requested content includes a content identifier and the mobile application includes a mobile application identifier, the method further comprises:
   determining if the content identifier is in an index, the index storing a mapping with an identifier for content associated with the mobile application stored in the cache and the mobile device identifier; and
   updating the index to include the content identifier for the requested content and the mobile application identifier.

13. The method of claim 10, comprising:
   determining that the content stored in the cache is not a current version of the content; and
   delivering the current version of the content.

14. The method of claim 10, wherein the request for content is associated with content associated with a link on a page; and
   determining that the content associated with the link is not within the cache.

15. The method of claim 10, wherein the request is a subscription request for content with an assigned tag, the method further comprising:
   determining that there is new content associated with the assigned tag;
   delivering the new content associated with the assigned tag into the cache without a further request.

16. The method of claim 15, further comprising:
   delivering content when the mobile application is initialized.

17. The method of claim 10, wherein the content includes a page layout template and content objects, the page layout template defining a page layout where the content objects are displayed.

18. The method of claim 10, wherein the mobile application is configured to enable a user to manage the content stored in the cache.

19. A non-transitory computer readable medium, comprising instructions for:
   receiving a request for content from a mobile application; and
   determining whether the requested content is in a cache associated with the mobile application, and
   if the content is not in the cache, delivering the requested content to the mobile application, wherein the requested content is configured to be presented to a user; and
   receiving a notification that the requested content was stored in the cache associated with the mobile application, wherein the requested content was stored in the cache based on a user selection.

20. The computer readable medium of claim 19, comprising instructions for:
   determining that the requested content should be cached; and
   delivering the requested content with rules designating conditions that requested content should be stored in the cache.

21. The computer readable medium of claim 19, wherein the requested content includes a content identifier and the mobile application includes a mobile application identifier, the instructions further for:
   determining if the content identifier is in an index, the index storing a mapping with an identifier for content associated with the mobile application stored in the cache and the mobile device identifier; and
   updating the index to include the content identifier for the requested content and the mobile application identifier.

22. The computer readable medium of claim 19, the instructions further for:
   determining that the content stored in the cache is not a current version of the content; and
   delivering the current version of the content.

23. The computer readable medium of claim 19, wherein the request for content is associated with content associated with a link on a page and wherein the instructions are further for:
   determining that the content associated with the link is not within the cache.

24. The computer readable medium of claim 19, wherein the request is a subscription request for content with an assigned tag and the instructions are further for:
   determining that there is new content associated with the assigned tag;
   delivering the new content associated with the assigned tag into the cache without a further request.

25. The computer readable medium of claim 19, wherein the instructions are further for:
   delivering content when the mobile application is initialized.

26. The computer readable medium of claim 19, wherein the content includes a page layout template and content objects, the page layout template defining a page layout where the content objects are displayed.

27. The computer readable medium of claim 19, wherein the mobile application is configured to enable a user to manage the content stored in the cache.

* * * * *